(12) United States Patent
Sridharanarayanan et al.

(10) Patent No.: US 8,587,610 B2
(45) Date of Patent: Nov. 19, 2013

(54) RENDERING SOURCE CONTENT FOR DISPLAY

(75) Inventors: Ambarish Sridharanarayanan, Redmond, WA (US); Georgi M. Chalakov, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 12/333,330

(22) Filed: Dec. 12, 2008

(65) Prior Publication Data

US 2010/0153842 A1    Jun. 17, 2010

(51) Int. Cl.
  *G06T 15/00*   (2011.01)
  *G06T 11/00*   (2006.01)

(52) U.S. Cl.
  USPC ............ 345/619; 345/588; 345/642; 715/247

(58) Field of Classification Search
  USPC .......................................... 715/247; 345/588
  See application file for complete search history.

(56) References Cited

U.S. PATENT DOCUMENTS

| | | | |
|---|---|---|---|
| 5,751,293 A * | 5/1998 | Hashimoto et al. ............ | 345/588 |
| 6,121,975 A * | 9/2000 | Mungenast et al. ........... | 345/588 |
| 6,191,800 B1 * | 2/2001 | Arenburg et al. .............. | 345/505 |
| 6,860,203 B2 * | 3/2005 | Danilo et al. .................. | 101/485 |
| 7,259,766 B1 * | 8/2007 | Livesey .......................... | 345/582 |
| 7,423,653 B2 | 9/2008 | Gettman et al. | |
| 2004/0194020 A1 * | 9/2004 | Beda et al. ..................... | 715/502 |
| 2004/0246251 A1 * | 12/2004 | Fenney et al. .................. | 345/426 |
| 2005/0140694 A1 * | 6/2005 | Subramanian et al. ....... | 345/619 |
| 2005/0259108 A1 * | 11/2005 | Chladny ......................... | 345/588 |
| 2006/0072831 A1 | 4/2006 | Pallister | |
| 2007/0013723 A1 | 1/2007 | Souza et al. | |
| 2007/0146378 A1 * | 6/2007 | Sorgard et al. ................ | 345/581 |
| 2007/0216925 A1 | 9/2007 | Nakamura | |
| 2008/0005212 A1 * | 1/2008 | Levien ........................... | 708/275 |
| 2008/0109159 A1 * | 5/2008 | Shi et al. ........................ | 701/208 |
| 2008/0218521 A1 * | 9/2008 | Tuomi ............................ | 345/441 |
| 2009/0097047 A1 | 4/2009 | Mitsui | |
| 2009/0147016 A1 | 6/2009 | Barone et al. | |

FOREIGN PATENT DOCUMENTS

WO    2009068893 A1    6/2009

OTHER PUBLICATIONS

Kopf, et al., "Capturing and Viewing Gigapixel Images", Retrieved at <<http://citeseerx.ist.psu.edu/viewdoc/download?doi=10.1.1.94.4402&rep=rep1&type=pdf>>, ACM Transactions on Graphics (Proceedings of SIGGRAPH 2007), vol. 26, No. 3, Aug. 5-9, 2007, pp. 10.
Antoniou, Vyron, "Is Your Web Map Fit for Purpose? Drawing a Line under Raster Mapping", Retrieved at <<http://www.agi.org.uk/SITE/UPLOAD/DOCUMENT/Events/AGI2008/Papers/VyronAntoniou.pdf>>, AGI GeoCommunity 2008 Conference, Sep. 23-25, 2008, University College London, pp. 7.

(Continued)

*Primary Examiner* — Stephen Hong
*Assistant Examiner* — Keith Bloomquist
(74) *Attorney, Agent, or Firm* — Alleman Hall McCoy Russell & Tuttle LLP

(57) ABSTRACT

A method for rendering source content for display in a destination figure is provided. The method may include receiving the source content of the file, replicating the source content in a region surrounding the source content, such that replicated source content is aligned with the source content, extracting an axis-aligned rectangular tile containing the source content from the region, and rendering the axis-aligned rectangular tile onto the destination figure.

9 Claims, 3 Drawing Sheets

(56) References Cited

OTHER PUBLICATIONS

Wallace, et al., "Automatic Alignment of Tiled Displays for a Desktop Environment", Retrieved at <<http://www.scidac.gov/FES/FES_FusionGrid/pubs/wallace-jos2005.pdf>>, Journal of Software, vol. 15, No. 12, Jul. 2005, pp. 1-7.

Olsen, Thomas, "Introducing the Microsoft Direct2D API", Retrieved at <<http://blogs.technet.com/thomasolsen/archive/2008/10/29/introducing-the-microsoft-direct2d-api.aspx>>, Oct. 29, 2008, pp. 1-35.

"XPS & Windows Vista", Retrieved at <<http://softwareimaging.com/products-services/xps/DS-VistaXPS-v3.01E.pdf>>, pp. 4.

"XPS for Developers", Retrieved at <<http://www.microsoft.com/whdc/xps/xpsdevs.mspx>>, Aug. 6, 2008, pp. 2.

Sneath, Tim, "A Guided Tour of Windows Presentation Foundation", Retrieved at <<http://msdn.microsoft.com/en-us/library/aa480221.aspx>>, Sep. 2005, pp. 18.

"XPS Team Blog—XML Paper Specification and the Open Packaging Conventions", Retrieved at <<http://blogs.msdn.com/xps/Default.aspx?p=2>>, Sep. 15, 2006, pp. 5.

"Printing Overview", Retrieved at <<http://msdn.microsoft.com/en-us/library/ms742418(VS.85).aspx>>, Aug. 6, 2008, pp. 6.

"Maximum Performance from XPS Documents", Retrieved at <<http://download.microsoft.com/download/9/c/5/9c5b2167-8017-4bae-9fde-d599bac8184a/MaxPerfXpsDocs.doc>>, Oct. 2, 2007, pp. 12.

"XPS an Open XML Paper Specification", Retrieved at <<http://www.oberon2005.ru/doc/doc-msft2005-000001e.pdf>>, Dec. 15, 2005, pp. 393.

"XPS and Color Printing Enhancements in Microsoft Windows Vista", Retrieved at <<http://download.microsoft.com/download/9/c/5/9c5b2167-8017-4bae-9fde-d599bac8184a/Vista_print.docx>>, Dec. 17, 2007, pp. 10.

\* cited by examiner

RENDERING SOURCE CONTENT FOR DISPLAY

BACKGROUND

A fixed-document file preserves document fidelity and appearance regardless of the type of device on which the document is presented. In order to preserve the fidelity of a document, a fixed-document file includes markup language or objects that define the layout and visual appearance of each page of the document as well as rules that describe the processing, rendering, and printing intent of the document. The manner in which these rules are implemented may allow for great flexibility in the manner in which a document is rendered to accommodate differences in functionality of different rendering engines. However, differences in rendering engines may cause some rendering engines to render a fixed document file with sub-optimal rendering fidelity, rendering time, memory usage, and/or output file size. This may result in decreased quality of output, resulting in decreased user satisfaction.

SUMMARY

A method for rendering source content for display in a destination figure is provided. The method may include receiving the source content, replicating the source content in a region surrounding the source content, such that replicated source content is aligned with the source content, extracting an axis-aligned rectangular tile containing the source content from the region, and rendering the axis-aligned rectangular tile onto the destination figure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
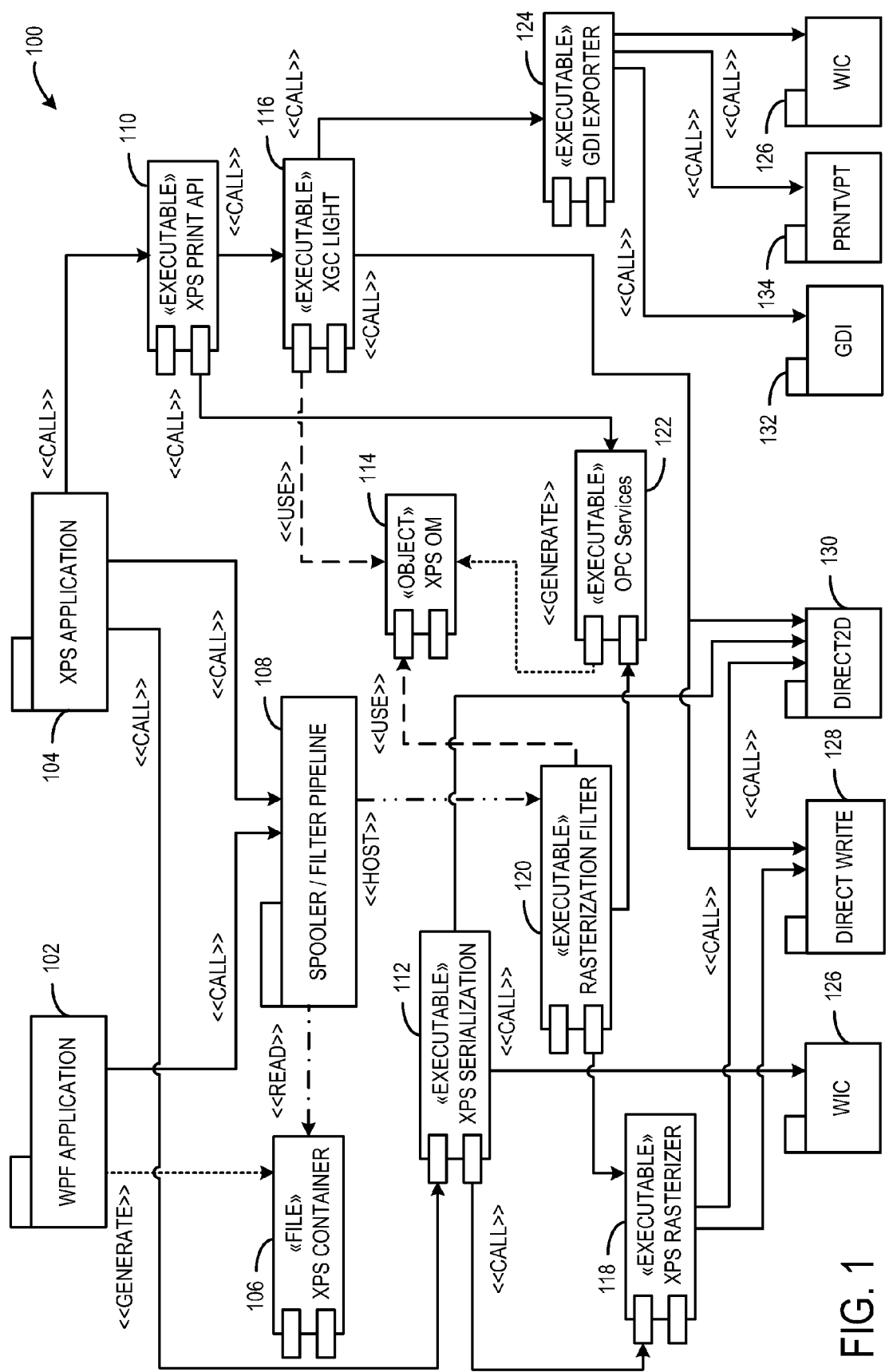
FIG. 1 is an architecture diagram of an embodiment of a rendering system.

FIG. 1 illustrates a system 100 for rendering source content for display. More particularly, system 100 may operate in the context of rendering source content formatted according to XML Paper Specification (XPS) for display. Source content of XPS rendered by system 100 may be displayed on a display device or printed for display on another medium, such as paper. Source content of XPS may be contained in files, streamed to a destination, generated in-place, or sent across a network. System 100 may include a WINDOWS® Presentation Foundation (WPF) application 102. WPF application 102 may be deployed as a programming model to unify a variety of application services related to visual aspects of the WINDOWS® operating system, such as fixed document rendering. WPF application 102 may generate an XPS container 106 which may be a fixed document file or other source containing source content. XPS application 104 may call XPS serialization module 112 to read Extensible Application Markup Language (XAML) code from WPF application 102 and create corresponding parts in the XPS document. Operation of XPS application 104 may affect rendering of source content in XPS container 106.

The print path to render the source content begins by XPS application 104 and WPF application 102 calling spooler/filter pipeline 108 to read XPS container 106 to identify source content to be rendered. XPS application 104 may call XPS print application programming interface (API) 110 to request print services to render the source content. XPS print API 110 may call Open Packaging Conventions (OPC) services 122 which may generate an XPS OM object 114 that may be used by an XPS-to-GDI Conversion (XGC) light module 116 to convert the XPS formatted source content and corresponding print instructions into a Graphics Device Interface (GDI) format for rendering. XGC light module 116 may be alternately referred to as a source content conversion module since the module may convert XPS formatted source content into a GDI compatible format for rendering. XGC-light module 116 may send the converted source content to DirectWrite rendering engine 128 and DIRECT2D rendering engine 130 to be rendered for display. Further, XGC light module 116 may send the converted source content to GDI exporter 124 to package the source content for rendering by GDI rendering engine 132. XGC light module 116 may also use Print Ticket Services (PRNTVPT) module 134, and Windows Imaging Component (WIC) 126 to render source content Continuing with FIG. 1, spooler/filter pipeline 108 may host rasterization filter module 120 which may use XPS OM object 114 and OPC services 122 to filter or identify XPS source content to be converted into raster image instructions by XPS rasterizer module 118 for rendering by a rendering engine such as DIRECT2D rendering engine 130 or Direct-Write rendering engine 128. XPS rasterizer module 118 may be called by XPS serialization module 112 and may receive XPS formatted parts that may be utilized to rasterize the source content. Further, XPS serialization module 112 may send XPS formatted parts or instructions to WIC 126 to facilitate rendering of the XPS source content. By converting various parts and print instructions to XPS format, the format of source content of an XPS document may be unchanged throughout the printing process, and thus may retain the original quality and fidelity of the document all the way through the end of the print path. Further, the XPS print path supports a modular, filter-based architecture that allows for print rendering functions to be moved out of the application and into the print path. As such, rendering of XPS source content may be more efficiently leveraged by other applications.

Figure 2:
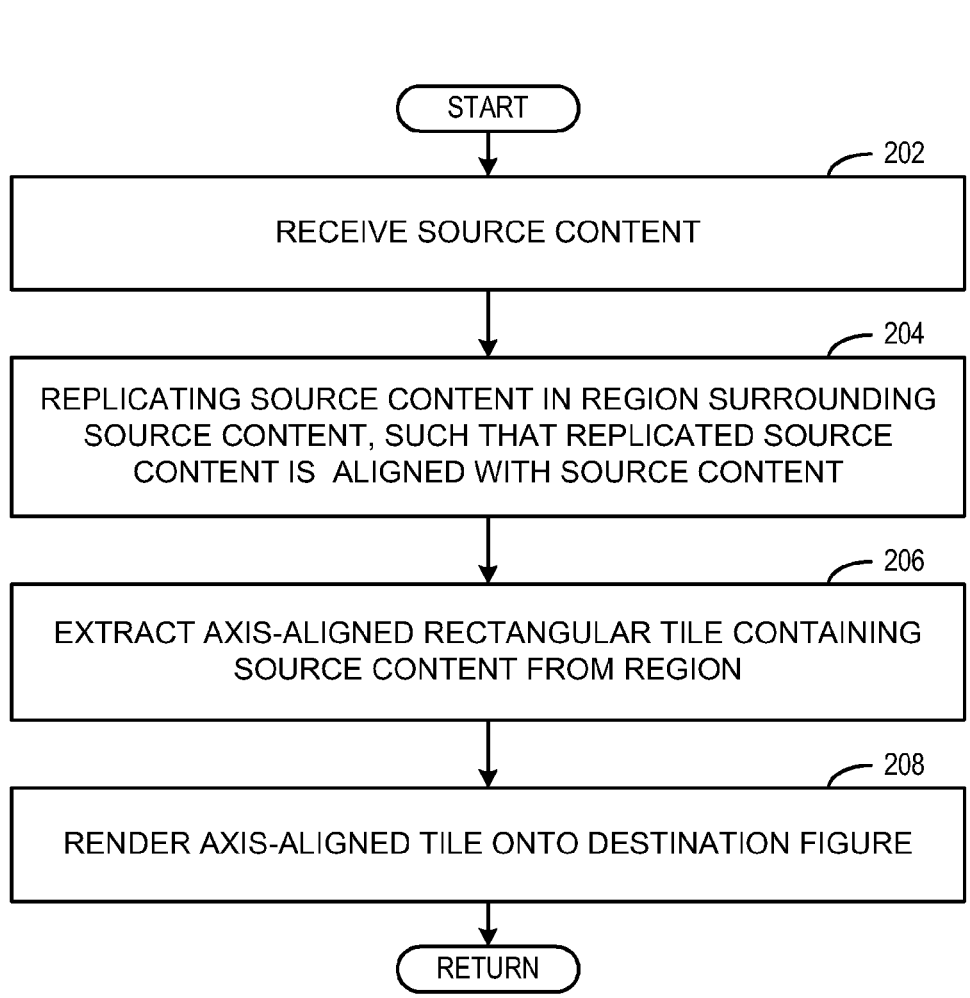
FIG. 2 is a flow diagram of an embodiment of a method for rendering source content for display on a destination figure.

Within the context of the system 100 described above, several methods for rendering source content may be practiced, as described below with reference to FIGS. 2 and 4. As one example, FIG. 2 illustrates a method 200 of rendering source content for display in a destination figure. In particular, method 200 prescribes a way of generating GDI-compatible rectangular tiles that include the source content which may be applied to a bitmap created by the GDI rendering engine during the print process. Method 200 may be particularly applicable to source content that is not axis aligned or otherwise easily rasterized. Method 200 may include, at 202 receiving source content. As discussed above, in one embodiment, the source content may be contained in an XPS container 106 that may be read by spooler/filter pipeline 108 as called by XPS application 104 of system 100. In some cases, source content may be received from across a network, or more particularly from a stream.

At 204, the method may include replicating the source content in a region surrounding the source content, such that replicated source content is aligned with the source content. In particular, the source content may be replicated such that the replicated source content is aligned on all sides of the source content to form a surrounding region. In some cases, the surrounding region is defined by an outer perimeter of the replicated source content. In some cases, replication of the source content may be achieved by performing flipping operations of the source content. Flipping operations may be performed based on a tile-mode of a brush for printing the source content. For example, the tile mode may be set to one or more of a variety of flipping operations that may be performed when replicating the source content, such as flipping about the X-axis, flipping about the Y-axis, and flipping about both the X-axis and the Y-axis.

At 206, the method may include extracting an axis-aligned rectangular tile containing the source content from the region. Since the replicated source content is aligned with the original source content as a result of the flipping operation, there is no distortion and the axis-aligned rectangular tile is an accurate representation of the source content. The axis-aligned tile is GDI-compatible for printing of the source content on a destination figure. Specifically, the rectangular tile may be easily rasterized since the dimensions of the tile are axis aligned. At 208, the method may include rendering the axis-aligned rectangular tile onto the destination figure.

By replicating the source content, a region that fully includes the source content may be created from which an axis-aligned rectangular tile may be extracted. Since the axis-aligned rectangular tile is GDI-compatible, the source content may be rendered utilizing GDI while avoiding resource intensive clipping operations. Accordingly, rendering of source content using GDI may be performed in quicker and more resource efficient manner.

It will be appreciated that method 200 may be implemented using the hardware and software of system 100 described above, or via other suitable hardware and software, to render source content of a fixed document file such as an XPS file or from another source for display. In one example, receiving, extracting, and replicating are performed by XPS-to-GDI conversion module 116 of XPS rendering system 100 and rendering the source content is performed by GDI rendering engine 132 of system 100. It will be appreciated that method 200 may be utilized in the rendering of source content by rendering engines other than a GDI rendering engine.

Figure 3:
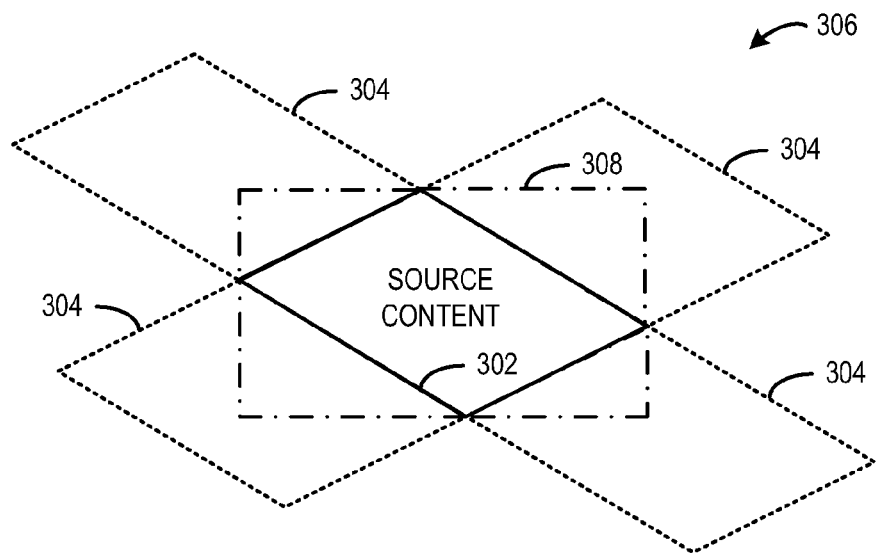
FIG. 3 is an example implementation of the flow diagram of FIG. 2 for rendering source content for display on a destination figure.

FIG. 3 shows an example implementation of method 200 as described above that may be used in the rendering of source content 302 by a GDI rendering engine. In the illustrated example, source content 302 (indicated by solid lines) is a parallelogram that is not axis aligned. In order to render source content 302 via the GDI rendering engine, the source content is processed to be axis aligned. In particular, axis alignment of the source content facilitates rasterization performed by the GDI rendering engine. Thus, a replication (in some cases flipping) operation is performed on the source content 302 to create replicated source content 304 (indicated by dotted lines). The replicated source content 304 are parallelograms that are not axis aligned, but are aligned with source content 302 on all four sides of source content 302. The source content 302 in combination with replicated source content 304 create a region 306 of source content that is neither shifted nor distorted. The region 306 may be large enough to extract an axis-aligned rectangular tile 308 (indicated by dot-dashed lines) that includes an accurate representation of the source content that can be rendered by the GDI rendering engine.

In previous operations utilizing a GDI rendering engine, source content that was not axis-aligned would have to be replicated and clipped to create source content that is axis aligned for rasterization. The clipping operations can be resource expensive, consuming valuable processor time, and resulting in slower rendering. Method 200 provides an alternative to performing clipping operations, which can result in quicker rendering of source content while freeing up resources for other computing tasks.

Figure 4:
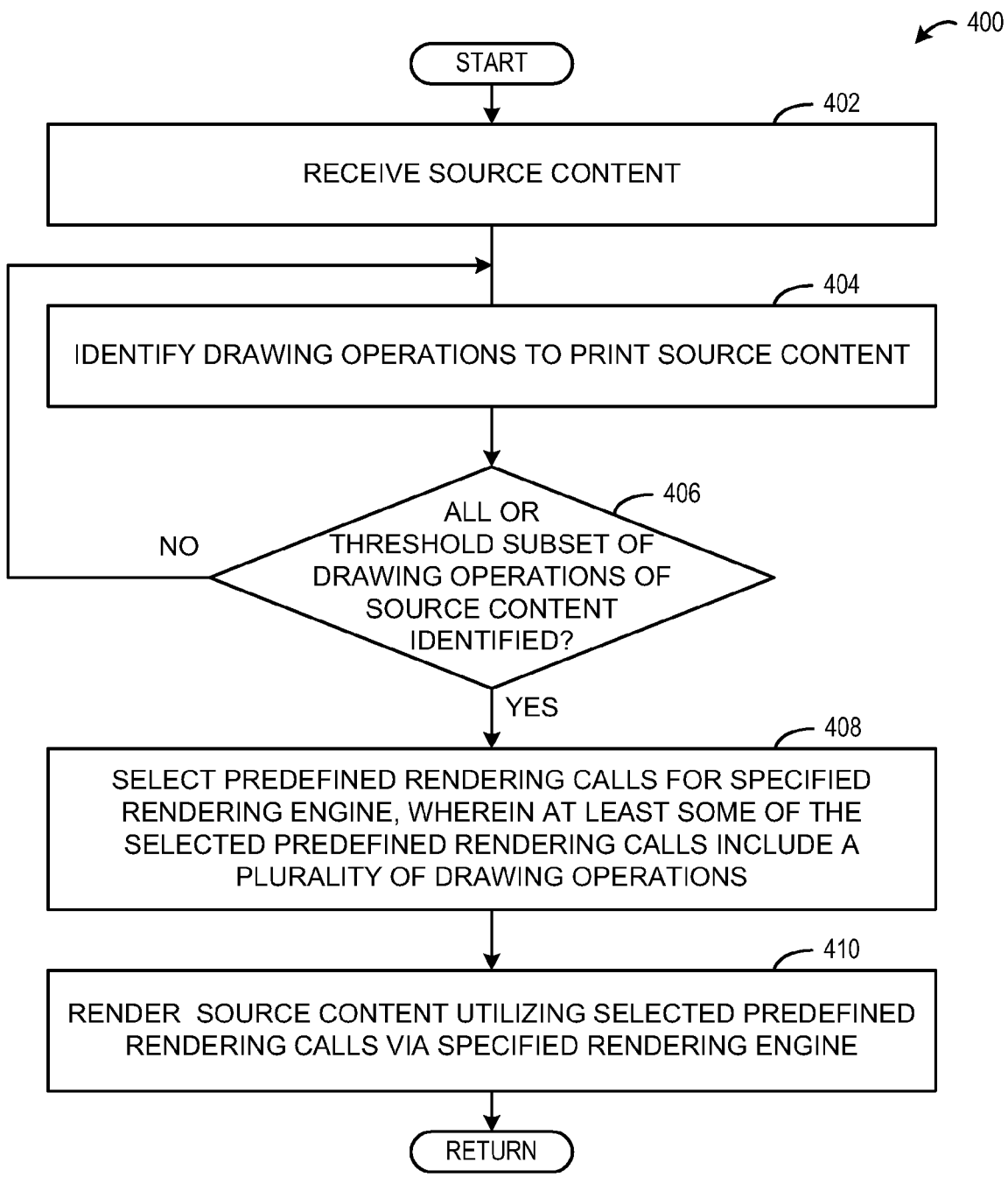
FIG. 4 is a flow diagram of another embodiment of a method for rendering source content for display on a destination figure.

FIG. 4 illustrates a method 400 of rendering source content for display in a destination figure. In particular, method 400 prescribes a way of providing source content that includes rendering code-paths that are optimized for a specified rendering engine (e.g., a GDI rendering engine). Method 400 may include, at 402 receiving source content. As discussed above, in one embodiment, the file may be XPS container 106 that may be read by spooler/filter pipeline 108 as called by XPS application 104 of system 100.

At 404, the method may include identifying multiple drawing operations to print the source content. The drawing operations may include associated rendering primitives. For example, the drawing operations may include stroking, filling, line segments, and cubic Bezier segments, as well as other curve segments (e.g., quadratic Bezier segments).

At 406, the method may include determining if all drawing operations of the source content have been identified. By delaying drawing of the drawing operation until all drawing operations of the source content have been identified, the type and number of geometry figures and other drawing operations for printing the source content may be tracked and considered for combination into a predefined rendering call when possible. If all drawing operations have been identified, the method moves to 408. Otherwise, all drawing operations have not been identified, and the method returns to 404 to continue identifying drawing operations for printing the source content. It will be appreciated in other embodiments, instead of determining if all drawing operations have been identified, the method may include at 406 determining if a threshold subset of drawings operations have been identified sufficient to enable selection of predefined rendering calls at 408.

At 408, the method may include, upon identifying all or a threshold subset of the drawing operations, selecting predefined rendering calls for a specified rendering engine. At least some of the predefined rendering calls for the specified rendering engine may be selected to include a plurality of the identified drawing operations.

In some embodiments, the predefined rendering calls are selected to include a plurality of the multiple drawing operations whenever possible. Thus, the predefined rendering calls may be selected in order to minimize the number and/or size of the associated rendering primitives generated by the specified rendering engine. In some cases, the predefined rendering calls may include geometric figures (e.g., Polydraw). For example, a plurality of line-segment type drawing primitives may be identified as being positioned to form a square geometry. A predefined rendering call to print the square may be selected in place of each individual line-segment type drawing primitive. By replacing the four line segment drawing primitives with a predefined square geometry rendering call, the length of the rendering output file may be reduced. Further, in some cases, the predefined rendering calls may include collections of geometric figures (e.g., PolyPolygon).

The predefined rendering calls that are selected may vary depending on the rendering engine that is specified, since different rendering engines may be capable of executing different predefined rendering calls. For example, a GDI rendering engine may support rendering calls for drawing geometries comprised of line-segments and cubic Bezier segments. The GDI rendering engine, in particular, also provides optimized code-paths for common cases like polygons, collections of polygons (with no Beziers), stroking without filling, filling without stroking, etc.

At 410, the method may include rendering the source content utilizing the selected predefined rendering calls via the specified rendering engine. By delaying drawing of each of the drawing operations to identify the entire geometry of the source content, appropriate rendering calls may be selected in which drawing operations may be combined in predefined rendering calls that are optimized for the specified rendering engine. Accordingly, the code-path optimization can result in quicker rendering times and reduced output file size for the source content.

It will be appreciated that method 400 may be implemented using the hardware and software described above, or via other suitable hardware and software to render source content of a fixed document file such as an XPS file or from another source for display. In one example, receiving, identifying, and selecting are performed by XPS-to-GDI conversion module 116 of XPS rendering system 100 and rendering the source content is performed by GDI rendering engine 132 of system 100. It will be appreciated that method 400 may be utilized in the rendering of source content by rendering engines other than a GDI rendering engine.

Figure 5:
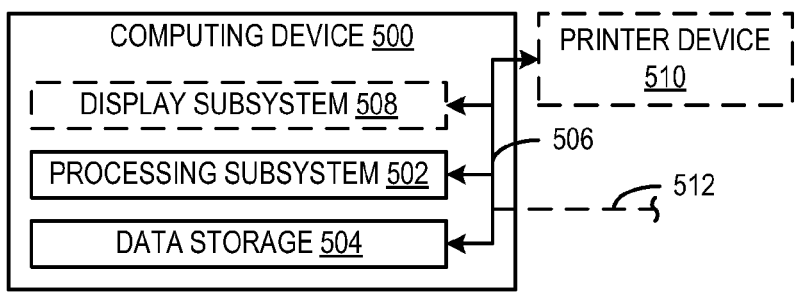
FIG. 5 is a schematic diagram of an embodiment of a computing device on which the rendering system of FIG. 1 may be implemented.

It will be appreciated that the modules of system 100, which may perform at least some part of the above described methods, may be executed by a computing device. FIG. 5 is a schematic diagram of an embodiment of a computing device 500 on which system 100 may be implemented. Computing device 500 may be virtually any suitable computing device including a mainframe computer, personal computer, laptop computer, portable data assistant (PDA), computer-enabled wireless telephone, networked computing device, printing device, or other suitable computing device. Computing device may be optionally connected to other computing devices via computer networks 512, such as the Internet. Computing device 500 may include a processing subsystem 502, volatile and non-volatile memory represented as data storage 504 which may communicate via communication subsystem (e.g., computer bus) 506. Computing device 500 may be configured to execute programs stored in data storage 504 or a different remote storage device using processing subsystem 502.

In some embodiments, computing device 500 may include a display subsystem 508. When included, display subsystem 508 may be used to present a visual representation of data held by data storage 504. In some embodiments, a printer device 510 may be in communication with computing device 500 via communication subsystem 506 or otherwise incorporated with computing device 500. When included, printer device 510 may print a visual representation of data held by data storage 504 for display on a tangible medium, such as paper. The herein described methods and processes change the data held by the data storage 504, and thus transform the state of the data storage 504. The state of display subsystem 508 may likewise be transformed to visually represent changes in the underlying data. Further, printer device 510 may print visual representations of the transformations of the underlying data to paper or other tangible medium.

As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for rendering source content for display in a destination figure comprising:
   receiving the source content contained in a parallelogram that is not axis-aligned;
   replicating the parallelogram in a region surrounding the parallelogram, such that replicated parallelograms are aligned with the parallelogram;
   extracting an axis-aligned tile containing an entirety of the parallelogram from the region and at least some of the replicated parallelograms, wherein the parallelogram and the replicated parallelograms fill the axis-aligned tile without being shifted or distorted; and
   rendering the axis-aligned tile in a bitmap onto the destination figure without clipping the entirety of the parallelogram, wherein the parallelogram is replicated in the region prior to rendering the axis-aligned tile in the bitmap.

2. The method of claim 1, wherein the axis-aligned tile is a rectangular tile.

3. The method of claim 1, wherein a flipping operation is performed to replicate the parallelogram based on a tiling-mode specified by a brush element.

4. The method of claim 1, wherein the source content is a fixed document file.

5. The method of claim 4, wherein the fixed document file is an XML Paper Specification (XPS) file.

6. The method of claim 5, wherein rendering is performed by a graphics device interface (GDI) rendering engine of an XPS rendering system.

7. The method of claim 6, wherein receiving, replicating, and extracting are performed by a XPS-to-GDI conversion module of the XPS rendering system.

8. A computer rendering system comprising:
   a source content conversion module, executed by a computing device, configured to receive source content contained in a parallelogram that is not axis-aligned, replicate the parallelogram in a region surrounding the parallelogram, such that replicated parallelograms are aligned with the parallelogram, and extract an axis-aligned rectangular tile containing an entirety of the parallelogram from the region and at least some of the replicated parallelograms, wherein the parallelogram and the replicated parallelograms fill the axis-aligned tile without being shifted or distorted; and
   a rendering engine, executed by the computing device, configured to render the axis-aligned rectangular tile in a bitmap onto a destination figure without clipping the entirety of the source content, wherein the source content is replicated prior to rendering of the axis-aligned tile in the bitmap.

9. The system of claim 8, wherein the source content conversion module is further configured to identify drawing operations to print the source content, and in response to identification of all drawing operations to print the source content, select predefined rendering calls to the rendering engine that include a plurality of the drawing operations when possible; and wherein the rendering engine is further configured to render the source content to the destination figure utilizing selected predefined rendering calls received from the source content conversion module.

* * * * *